April 7, 1942.   M. A. DE WITT   2,279,111

OIL GAUGE ROD WIPER

Filed July 16, 1940

INVENTOR
*Myrtle A. DeWitt*

BY *Webster & Webster*
   attys

Patented Apr. 7, 1942

2,279,111

UNITED STATES PATENT OFFICE 2,279,111

OIL GAUGE ROD WIPER

Myrtle A. De Witt, San Francisco, Calif.

Application July 16, 1940, Serial No. 345,780

4 Claims. (Cl. 15—210)

This invention relates generally to engine equipment, and in particular is directed to an improved oil gauge rod.

The principal object of the invention is to provide an oil gauge rod which includes in unitary assembly therewith, a wiping assembly arranged so that when the oil gauge rod is withdrawn from the engine crank-case, the wiping assembly may be manually reciprocated to wipe the rod free of oil preparatory to reinserting the rod into the crankcase to determine the oil level therein.

A further object of the invention is to provide an oil gauge rod including a wiping assembly movable along the rod, said assembly having opposed spring fingers engaging the rod at an angle, and functioning as the wiping elements.

Another object of the invention is to provide an oil gauge rod, as in the preceding paragraph, wherein the spring fingers serve as means to frictionally secure the oil gauge rod in the port of the engine block.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
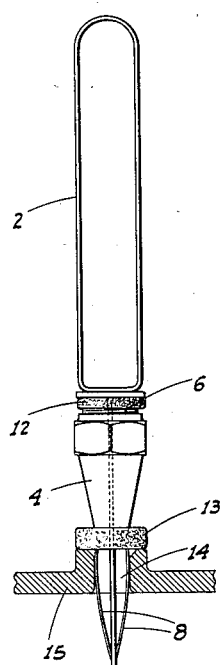
Figure 1 is an elevation of the invention as applied to a flat oil gauge rod, and shown as normally engaged in the port of an engine block.
Figure 2:
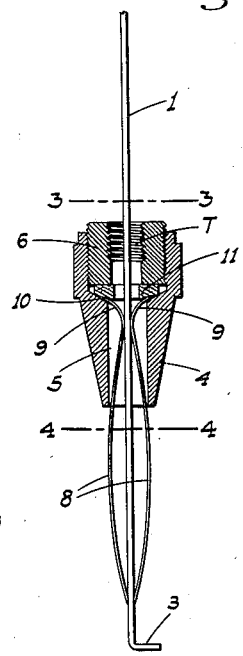
Figure 2 is a fragmentary elevation of the oil gauge rod with the wiping assembly as advanced to the lower end of said rod; such wiping assembly being shown in section.

Referring now more particularly to the characters of reference on the drawing, and particularly at present to Figs. 1-4 inclusive, numeral 1 indicates an oil gauge rod of the flat type formed at its upper end with a suitable handle 2. At its lower end the rod 1 is bent to form a laterally projecting stop element 3.

The wiping assembly is slidably mounted on rod 1 between handle 2 and stop element 3, and comprises the following:

A sleeve 4 of substantial length surrounds the rod 1 in slidable relation thereto; the bore 5 of said sleeve being of a diameter only slightly greater than the width of flat rod 1, except that adjacent its upper end said bore is enlarged for the reception of a guide bushing 6 having opposed vertical slots 7 cut therein and in which the edges of rod 1 engage.

A pair of relatively long opposed spring fingers 8, of spring metal or similar material, engage opposed faces of the rod 1 at spaced points; said spring fingers being longitudinally concave relative to said rod, and of substantially the same width. The upper end portions of said spring fingers project into the bore 5 of sleeve 4; the spring fingers being engaged intermediate their ends and held under compression by the sleeve at the lower end of the bore, and the uppermost point of engagement of the fingers with the rod being in said bore. The spring fingers beyond said uppermost point of engagement with rod 1 are formed with outwardly and upwardly curving extensions 9 whose outer ends rest against an annular face 10 formed in the bottom of the enlarged portion of bore 5, such face sloping inwardly and downwardly as shown. A compression gasket or washer 11 is disposed between the lower end of guide bushing 6 and face 10; the finger extensions 9 being firmly engaged between said gasket and face. Flexible washers 12 and 13 of felt or the like are fitted on rod 1 immediately above and below sleeve 4 and serve as cushion stops, and also prevent oil from gaining access to the exterior of sleeve 4 which serves as a handle.

In use, the oil gauge rod and included wiping assembly are normally disposed in the position shown in Fig. 1; the spring fingers 8 frictionally engaging in the usual oil gauge rod port 14 in engine block 15; the rod 1 being advanced through said port as far as possible and washer 13 being closely engaged between sleeve 4 and block 15.

When it is desired to test the level of the oil in the crank case, the oil gauge rod is withdrawn from port 14. Thereafter, the sleeve 14 is grasped in the fingers of one hand and advanced toward the normally lower end of the rod 1 until spring fingers 8 engage stop element 3. As the spring fingers 8 at their ends frictionally engage rod 1 on both faces and at an angle thereto, they effectively wipe all the oil therefrom with downward movement of the wiping assembly, thus cleaning the rod, as is desired. The wiping assembly is then retracted to its uppermost limit of movement, and the rod again engaged through port 14 and into the crankcase, in order to obtain an oil marking on the then clean rod.

If at any time it is desired to increase the tension of spring fingers 8, this can be accomplished to a certain extent by adjusting bushing 6 inwardly, which causes additional compression on gasket 11 and resultant downward and inward sliding movement of extensions 9 on face 10 which results in a tendency of spring fingers 8 to bow outwardly to a somewhat greater extent.

Figure 5:
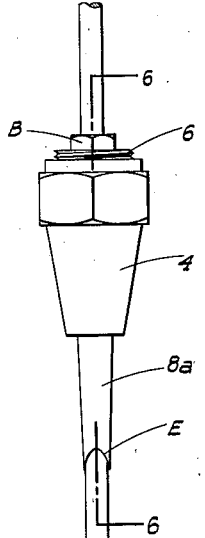
Figure 5 is an elevation of a modified form of the wiping assembly as modified for use in connection with a round oil gauge rod.
Figure 3:
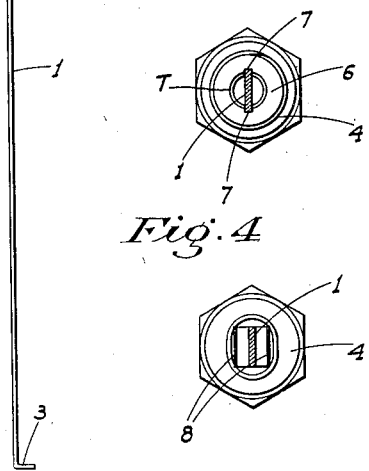
Figure 3 is a cross section taken on line 3—3 of Fig. 2.
Figure 4:
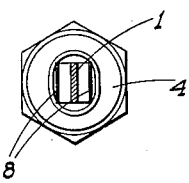
Figure 4 is a cross section taken on line 4—4 of Fig. 2.
Figure 6:
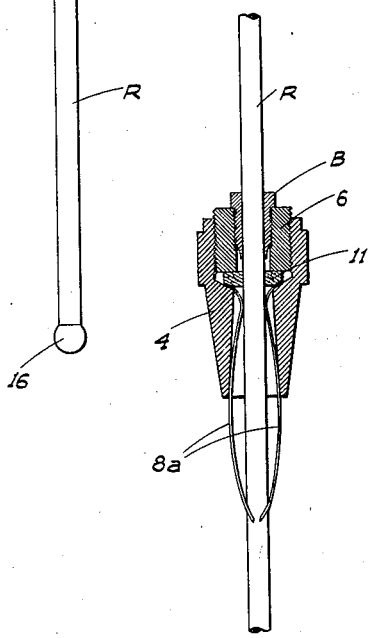
Figure 6 is a sectional elevation on line 6—6 of Fig. 5.

In the modification of the invention shown in Figs. 5 and 6, the wiping assembly is embodied in connection with a round oil gauge rod R. In this embodiment the same sleeve 4, bushing 6, and finger holding gasket 11 are used as in the type of wiping assembly shown in Fig. 1, but here the lower ends of spring fingers 8 are formed with a sharply concave or arcuate lower edge E. The lower edge of the spring fingers is so formed in order that each of the spring fingers at said edge engages approximately half way about the round rod so that upon manipulation of the wiping assembly to wipe substantially all of the oil from said rod. In order to guide the round rod through bushing 6, I provide an additional guide bushing B which is threaded into bushing 6 and through which additional bushing the rod R slidably engages with a close running fit. In order to prevent this form of the wiping assembly from escaping from the lower end of the round rod R, such end of the rod is enlarged as at 16.

The bushing 6 is tapped at its upper ends as at T even though the flat rod is used, so that said bushing is adaptable without change for either the flat or round oil rod.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An oil gauge rod wiper comprising a sleeve adapted to be slidably mounted on a rod, a pair of opposed outwardly bowed spring fingers to engage with the rod at their ends, the upper portion of said fingers projecting into the bore of said sleeve, the upper portion of said bore in the sleeve being enlarged, a guide bushing for the rod threaded into said enlarged portion of the bore, and extensions on the upper ends of the spring fingers, said extensions projecting in opposite directions laterally and being clamped between the lower end of the guide bushing and the annular face formed by the bottom of said enlarged portion of the bore.

2. A device as in claim 1 in which said annular face formed by the bottom of the enlarged portion of the bore slopes inwardly and downwardly; said extensions curving upwardly and outwardly from the adjacent rod engaging ends of said spring fingers, and there being a compression washer engaged between said extensions and said guide bushing.

3. An oil gauge rod wiper comprising a pair of opposed spring fingers converging toward one end and at said end adapted to engage a rod in wiping relation, a sleeve slidable on the rod and having a bore which at one end clears the rod, the fingers at their other end projecting into said one end of the bore, and means securing the fingers at said other end in the sleeve; the sleeve at said one end engaging the fingers intermediate their ends and springing said fingers inwardly.

4. An oil gauge rod wiper comprising a sleeve having a bore adapted to receive a rod in clearance relation, a pair of opposed spring fingers projecting lengthwise of the rod on opposite sides thereof from within the bore, and means mounting the sleeve and fingers together as a unit; said fingers at their outer end and at a point within the bore converging toward each other and engaging the rod.

MYRTLE A. DE WITT.